United States Patent [19]

Kressirer et al.

[11] Patent Number: 4,683,410
[45] Date of Patent: Jul. 28, 1987

[54] METHOD FOR DETECTING STEP LOSSES IN STEPPING-MOTOR-DRIVEN ADJUSTING DEVICES

[75] Inventors: Rudolf Kressirer, Frankfurt am Main; Siegfried Oehler, Hofheim am Taunus, both of Fed. Rep. of Germany

[73] Assignee: Hoechst Aktiengesellschaft, Frankfurt, Fed. Rep. of Germany

[21] Appl. No.: 748,315

[22] Filed: Jun. 24, 1985

[30] Foreign Application Priority Data

Jun. 26, 1984 [DE] Fed. Rep. of Germany ....... 3423420

[51] Int. Cl.4 .............................................. H02P 8/00
[52] U.S. Cl. ..................................... 318/696; 318/685
[58] Field of Search ................................ 318/696, 685

[56] References Cited

U.S. PATENT DOCUMENTS 4,362,980 12/1982 Itzkowitz ............................ 318/685

Primary Examiner—William M. Shoop, Jr.
Assistant Examiner—Saul M. Bergmann
Attorney, Agent, or Firm—Finnegan, Henderson, Farabow, Garrett & Dunner

[57] ABSTRACT

In the method for detecting step losses in stepping-motor-driven actuating devices, a reference position of the actuating device is used for generating a sequence of drive pulses for the stepping motor. Simultaneously, the motor rotation is used for generating a pulse sequence which is compared at the rate of the drive pulses with a pattern, specific to the type of construction, of the stepping motor.

2 Claims, 2 Drawing Figures

| STEP NO. | 1..4...8...12 usw. |
|---|---|
| SEQUENCE OF PULSES OF THE LIGHT BARRIER | — — — —  — — — —  — — — — — 0 |
| SEQUENCES OF THE SELECTION PULSES | $u_4$: 1001 1001 1001 1001 1001 1001 1001 1001 1001<br>$u_1$: 1100 1100 1100 1100 1100 1100 1100 1100 1100<br>$u_3$: 0110 0110 0110 0110 0110 0110 0110 0110 0110<br>$u_2$: 0011 0011 0011 0011 0011 0011 0011 0011 0011 ← DESIRED POSITION |

FIG. 2

METHOD FOR DETECTING STEP LOSSES IN STEPPING-MOTOR-DRIVEN ADJUSTING DEVICES

It is known to check stepping motors or pulse-operated synchronous motors for step loss by means of encoders which optically sample binary codes having various lengths, depending on resolution, on a corotating disk. Encoders consist of a segmented disk having various light/dark fields and of an optical sensor. With similar types of light and dark field, they are also called incremental displacement pickups. Each motion step executed corresponds to a counting pulse of a subsequent counter. Mechanical, piezo-electric or optical devices are use as stop or limit position switches. They prevent overloading or are used for finding a fixed reference point (initialization) or stop.

The comparatively high costs are disadvantageous, especially with relatively large numbers of items. In addition, the information regarding the absolute position is frequently not needed since it is already available in some form in the drive unit of the associated stepping motor (for example as number of steps made) so that only the correct execution of the stepping pulses output must be checked. Stop switches cannot be used for checking step losses during motor operation since they are fixed in location. Incidentally, they would also be complicated to adjust.

Accordingly, the object exists of creating a method by means of which the abovementioned disadvantages are avoided.

The invention as characterized in the claim achieves the object by the fact that the desired position of the actuating device is used for generating a sequence of drive pulses for the stepping motor, and the rotor rotation is used for generating a pulse sequence which is compared at the rate of the drive pulses with a pattern which is predetermined by the type of construction of the stepping motor.

The method according to the invention offers the advantage of freedom from wear since no mechanical contacts are needed. Adjustment of the required device is simple and uncritical. The method is inexpensive and remains unaffected in the event of supposed step losses in the acceleration phase.

FIG. 2 shows a pulse pattern for the energization of the stepping motor.

Figure 1:
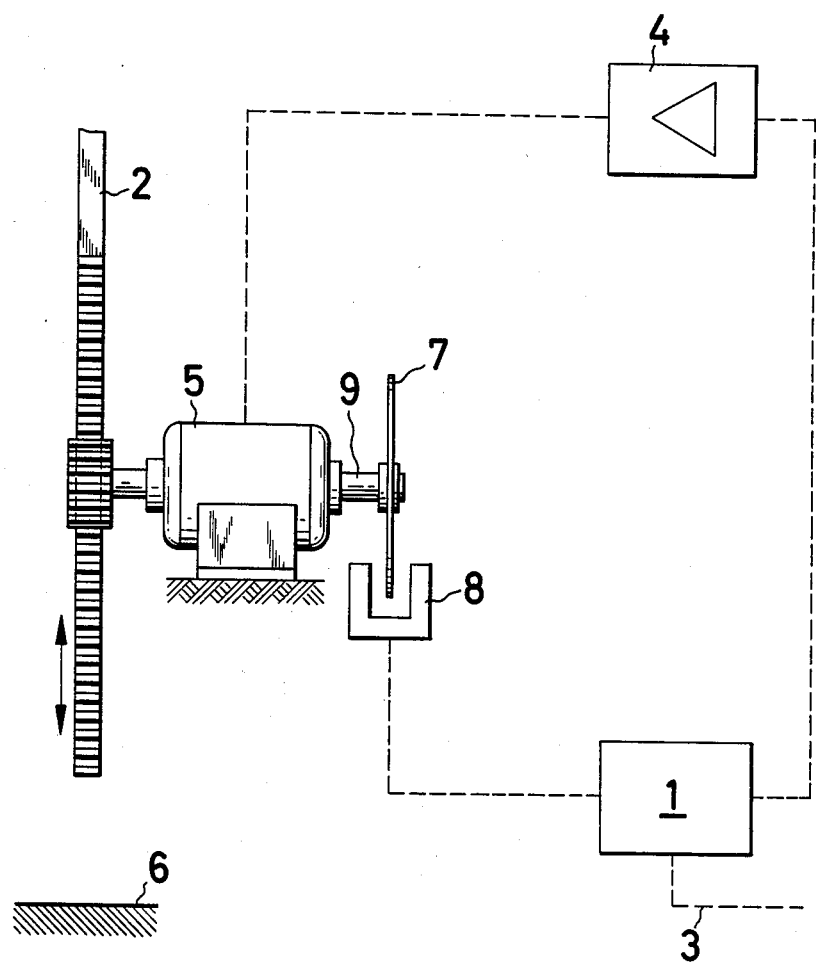
FIG. 1 shows the control of a stepping motor activating a serynge.

In the text which follows, the invention is explained in greater detail with the aid of the drawing which represents only one embodiment:

In a computer (1), a value corresponding to the nominal position of the actuating device (2) having the stop (6) is entered via the line (3), by means of which computer drive pulses or a sequence of drive pulses are generated which, if necessary, can be amplified, for example, by means of a driver stage (4). The motor shaft (9) of the stepping motor (5) is rigidly connected to a segmented disk (7) which, when the motor is rotating, generates a pulse sequence in a light barrier (8). The pulse sequence is compared in the computer (1) at the rate of the sequence of the drive pulses with a pattern which is predetermined by the type of construction of the motor (5). For a continuous rotation, the stepping motor (5) requires a number, determined by the type of construction, of drive signals (sequence) which is continuously repeated until the desired position is reached. When an operating condition occurs in which a difference of more than half the length of the sequence is produced between the rotor position and the electrically predetermined drive condition, a step loss occurs and the rotor jumps into a new stable position. The segmented disk (7) can be constructed in such a manner that the segment width corresponds to the length of the sequence, that is to say the sensor (8) generates a pulse sequence which corresponds to the length of the sequence of the drive pulses. During a step loss, no change in level occurs for a brief period at the sensor; there is no match with the pattern and the motor is switched off.

To detect a motor step loss, the segmented disk 7 which is rigidly connected on the shaft end 9 is monitored by the light barrier 8 which generates a sequence of pulses related to the step pulses. This is shown diagrammatically in FIG. 2.

Along the top row of FIG. 2 are displayed the step numbers of the stepping motor 5 in increments of four which directly relate to the sequence of drive pulses. The sequence of pulses generated by the light barrier 8 and the segmented disk 7 are illustrated immediately below the step numbers, and are represented on the far right end by binary bits 1 and 0 representative of, alternately, a light and a dark field on the segmented disk. The sequence of drive pulses, represented by $U_1$, $U_2$, $U_3$ and $U_4$, corresponding to the 4-phases of the stepping motor are shown immediately below the sequence of light pulses.

The sequence of drive pulses will be repeated as long as the predetermined desired position is not reached. The drive pulses are checked to determine whether a step loss has occurred by monitoring whether the light barrier levels change at every fourth step. If a single step loss has occured, the light barrier level will change at a step other than every fourth step.

EXAMPLE

In a dilutor, which is used as a part of an analyzer for fluid metering in quantitative protein determination, the piston of the metering syringe is connected by a holder to a toothed rack (2). This rack is driven via a pinion gear by a 4-phase hybrid stepping motor. The choice of direction of rotation determines whether fluid is taken in or given off. A change-over valve attached to the syringe outlet controls the direction of the medium.

The stepping motor (5) carries on one shaft end (9) a segmented disk (7) having 25 light and dark fields each. With a stepping angle of 1.8° a level change occurs every four steps of the disk at a forked light barrier (8) which samples the segments. This implements two functions:

(1) On starting operation, the dilutor is initialized, that is to say the toothed rack (2) runs into the syringe cylinder up to the mechanical stop (6). The step loss occuring at the stop is used for switching off the motor (3). This determines the starting position (zero point) for the piston.

(2) During taking in or giving off of liquid, any faulty metering is detected by the running check via the segmented disk by means of a step loss.

The stepping motor is put into rotation by means of a repetitive sequence of four different drive pulses. If a step loss occurs, the rotor assumes a position which differs by four steps from its supposed position. So that this deivation is detected by the segmented disk, its graduation is designed in such a way that the transition from a light to a dark field or vice versa occurs after four disk steps in each case. After each drive pulse, the position of the shaft is sampled via the segmented disk and the sequence of "0" and "1" levels produced in this manner is compared with a predetermined pattern. In this case, this pattern consists of a sequence of four "0" and four "1" levels each as produced with the correct execution of steps. During the comparison of the two sequences, a certain number of non-matching levels is still permitted in each segment section without producing an error message. This is necessary since acceleration effects can lead to a short-term angular offset between rotor and stator. The offset is compensated again by the elastic restoring forces at the end of the acceleration phase.

We claim:

1. A method of detecting step losses caused by ineffective driving pulse commands in a stepping motor driven actuating device movable through incremental steps, said motor having a shaft and a rotor rigidly attached to said shaft said rotor having a plurality of segments providing alternate light and dark fields, said method comprising:

determining a desired position of the actuating device;

generating a plurality of drive pulse sequences, each said sequence of drive pulses operative to move said actuating device a single step;

sensing said alternate light and dark fields at a single position adjacent said rotor in response to operation of the stepping motor;

generating a light pulse sequence of binary bits in response to sensing of the light and dark fields during rotation of said rotor, each light pulse of said light pulse sequence having a duration corresponding to each said drive pulse sequence;

comparing each bit of said light pulse sequence of binary bits to said plurality of driving pulse sequences during the stepping of the motor to detect said step losses of the actuating device from said desired position.

2. The method as in claim 1, further including the step of stopping the rotation of the motor upon the detection of lost steps of the actuating device.

* * * * *